United States Patent Office 3,660,477
Patented May 2, 1972

3,660,477
OXIDATION OF POLYALKYL-SUBSTITUTED AROMATICS IN ALKALINE MEDIA

Dieter H. Otterbach, Haddonfield, and John W. Porter, Brooklawn, N.J., assignors to E. I. du Pont de Nemours and Company, Wilmington, Del.
No Drawing. Filed July 2, 1969, Ser. No. 838,689
Int. Cl. C07c 63/02
U.S. Cl. 260—524 R     12 Claims

ABSTRACT OF THE DISCLOSURE

One alkyl group of polyalkyl-substituted aromatic compounds is selectively oxidized to a carboxyl group with molecular oxygen in the presence of aqueous alkali metal bicarbonate and a catalytic amount of iodine and iodide ions at a temperature of about from 160 to 230° C., the pH of the reaction mixture being less than about 10, and said reaction mixture containing sufficient bicarbonate to neutralize carboxyl groups as they are formed.

BACKGROUND OF THE INVENTION

This invention relates to a process for selectively oxidizing, in basic media, one alkyl group of polyalkyl-substituted aromatics. The resulting alkyl-substituted alkali metal aromatic carboxylates can be acidified in a conventional manner to give the corresponding carboxylic acids which are useful intermediates in organic syntheses. For example, the alkyl-substituted carboxylic acids can be further oxidized in a conventional manner to aromatic polycarboxylic acids which are useful in the preparation film- and fiber-forming polyesters.

Several methods have been disclosed for the oxidation of polyalkyl aromatic compounds or partially oxidized derivatives thereof to aromatic carboxylic acids in basic media. For example, U.S. 3,331,870 discloses the preparation of alkali metal salts of aromatic carboxylic acids by oxidizing xylenes and other alkyl-substituted aromatic hydrocarbons in the presence of aqueous alkali metal hydroxide or carbonate and metal halide catalyst. The alkali metal aromatic carboxylates are then acidified, giving the corresponding carboxylic acids. However, in the exemplified oxidation of p-xylene, the best results are about a 60% conversion to a 45.55 mixture of p-toluic and terephthalic acids. Hence this process is not economically attractive for the prepartion of either p-toluic acid or terephthalic acid.

SUMMARY OF THE INVENTION

This invention provides a process for selectively oxidizing one alkyl group of polyalkyl-substituted aromatic compounds and admixtures thereof with their partially oxidized derivatives, in basic media, to give high yields and conversions to the corresponding alkyl-substituted alkali metal aromatic carboxylates. Sometimes hereinafter, these polyalkyl-substituted aromatic reactants will be referred to generally as "polyoxidizable aromatics" and the corresponding oxidation products will be referred to as "aromatic carboxylate(s)."

The process of this invention comprises bringing molecular oxygen into contact with a mixture of polyoxidizable aromatic and aqueous alkali metal bicarbonate wherein the alkali metal has an atomic number of 11 through 55 (i.e., is sodium, potassium, rubidium or cesium) in the presence of a catalytic amount of iodine ($I_2$) and iodide ions ($I^-$) at a temperature of about from 160 to 230° C., the pH of the reaction mixture being below about 10 (measured at room temperature), and said reaction mixture containing an amount of said bicarbonate that is at least sufficient to neutralize the carboxyl groups as they are formed. The foregoing process is based on the discovery that substantially improved yields and conversions to aromatic carboxylic acids are obtained in aqueous alkaline media when alkali metal bicarbonate is used as the base and iodine and iodide ions are present in the reaction mixture as an oxidation catalyst. Equally important, the present process exhibits a high degree of selectively, i.e. one oxidizable group is oxidized to the substantial exclusion of others, thus giving a product mixture containing only minor amounts of overoxidized product, e.g., formylbenzoic acid and/or terephthalic acid. Other bases, e.g., alkali metal hydroxides and/or carbonates, are not nearly as effective as alkali metal bicarbonates, and often require oxidation temperatures and reaction times that result in product loss through overoxidation. Other halides, i.e., chlorides and bromides, and other forms of iodine, e.g. $IO_3^-$, have very little, if any effect on the oxidation reaction and do not give the superior results that are obtained by employing iodine and iodide ions. Thus, this invention employs a unique combination of alkali metal bicarbonate and iodine and iodide ions in the oxidation of polyalkyl-substituted aromatic compounds.

The process of this invention can be advantageously used in conjunction with the process described and claimed in coassigned application S.N. 838,699, filed concurrently herewith. The latter process comprises oxidizing alkyl-substituted alkali metal aromatic carboxylates to the corresponding polycarboxylates in an aqueous solution of alkali metal bicarbonate in the presence of iodine and iodide ions (stabilizer) at temperatures of about from 220 to 280° C. while maintaining the pH of the reaction mixture between about 7 and 10.

DETAILS OF THE INVENTION

The polyoxidizable aromatics used in the process of this invention are polyalkyl-substituetd aromatic compounds of the formula $$Q-Z-(R)_n$$

wherein Z is one of the following aromatic nuclei: benzene, naphthalene, biphenyl, diphenyl sulfone, diphenylalkane wherein the phenyl groups are bonded to the same carbon of a 1 or 2 carbon alkylene moiety, diphenyl ketone or diphenyl ether; each R is straight chain alkyl of up to 3 carbons and is bonded to a ring carbon of the Z nucleus; $n$ is 2, 3 or 4; Q is hydrogen or a nonoxidizable substituent such as halogen, nitro ($NO_2$), or alkoxy of 1 to 4 carbons and is bonded to a ring carbon of the Z nucleus; and at least one R is in the meta or para position with respect to at least one said substituent (i.e., hydrogen is not considered a substituent) on the same aromatic ring. By the latter requirement it is meant that R can be in the ortho position with respect to one or more ring substituents provided it is also in the meta or para position to at least one substituent on the same aromatic ring. The term substituent includes R and Q (other than hydrogen), and in the case of the bicyclic compounds, i.e., the naphthalenes, biphenyls, diphenyl sulfones, diphenylalkanes, diphenyl ketones and diphenyl ethers, also includes the second ring or such ring and the group through which it is bonded to the first ring, i.e., >$SO_2$, —$CH_2$—, —$CH(CH_3)$—, >$C(=O)$—, or —O—. 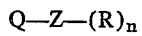
Compounds of the above formula may be employed singly or in combination, although mixtures will generally be of position isomers.

Typical polyoxidizable aromatics of the above formula, wherein Q is hydrogen, are:

p-xylene
m-xylene
1,3,5-trimethylbenzene
1,2,4-trimethylbenzene 1,2,4,5-tetramethylbenzene
p-diethylbenzene
p-di-n-propylbenzene
m- and p-ethyltoluene
dimethylnaphthalene
trimethylnaphthalene
diethylnaphthalene
triethylnaphthalene
di-n-propylnaphthalene
tri-n-propylnaphthalene
3,3'- and 4,4'-dimethyl biphenyl
3,3'- and 4,4'-dimethyl diphenylmethane and α,α-diphenylethane
3,3'- and 4,4'-dimethyl diphenyl ketone
3,3'- and 4,4'-dimethyl diphenyl sulfone
3,3'- and 4,4'-dimethyl diphenyl ether Also, analogues of the above-named compounds wherein Q is halogen, nitro, or 1 to 4 C alkoxy, instead of hydrogen, may be employed. Thus included, for example, are the above-named compounds wherein a ring carbon is substituted with fluoro, chloro, bromo, iodo, $-NO_2-$, methoxy, ethoxy, n-propoxy, n-butoxy, tert-butoxy and the like. All of these substituents are stable under the present oxidation conditions.

The polyalkyl-substituted aromatic hydrocarbons, and particularly those wherein $n$ is 2, are more readily available, hence preferred. Polyalkyl-substituted benzenes are a preferred class of reactants because there is greater demand for their oxidation products.

The polyoxidizable aromatic initially added to the reaction mixture can be practically pure polyalkyl-substituted aromatic or can be in crude form, i.e., can be in admixture with relatively minor amounts of normally associated impurities such as precursors whose composition depends on the method used to prepare the polyoxidizable aromatic. The latter preferably is admixed with less than about 5% of such impurities, based on the weight of the polyoxidizable aromatic. Additionally, the polyoxidizable aromatic can be in admixture with relatively small amounts of its own partially oxidized derivatives and can also be admixed with minor amounts of completely and overoxidized derivatives, as may be the case when the process of this invention is operated in a continuous or semi-continuous manner by withdrawing a product stream from the oxidizer, separating from this stream the desired alkali metal aromatic carboxylates, and recycling the remainder of the product stream to the oxidizer along with a fresh charge of raw materials. For example, when p-xylene is the starting material in the preparation of alkali metal p-toluate, its partially oxidized derivatives are p-methylbenzyl alcohol and p-tolualdehyde, its completely oxidized derivative is the p-toluate, and its overoxidized derivatives are the alkali metal salts of p-formylbenzoic acid, p-carboxybenzyl alcohol and terephthalic acid. In a continuous or semi-continuous operation, the polyoxidizable aromatic can be mixed with an amount of its partially oxidized derivatives that is equal to up to about 10% of the polyoxidizable aromatic, by weight, whereas the completely and overoxidized derivatives, taken together, normally will amount to less than about 5%, based on the weight of the polyoxidizable aromatic. The partially oxidized derivatives are readily oxidized to the desired aromatic carboxylates during the process of this invention.

The polyoxidizable aromatic is oxidized in an aqueous solution of alkali metal bicarbonate. Suitable alkali metal bicarbonates include bicarbonates of potassium, sodium, rubidium and cesium. Bicarbonates as opposed to carbonates are employed because the latter give the reaction mixture a pH substantially above 10 which markedly slows the rate of oxidation and causes oxidative degradation of reaction product. For reasons of economy and ease of final work-up of the reaction product, it is preferred to use sodium or potassium bicarbonate. In order to avoid degradation of product it is necessary to have sufficient alkali metal bicarbonate present to neutralize each carboxyl group newly-formed during the oxidation reaction. Consequently, there will be employed at least one mole bicarbonate per mole of polyoxidizable aromatic. Thus, there is at least a 1:1 molar ratio of bicarbonate to groups that are to be converted to —COOH. Molar ratios above about 2/1 can be tolerated but do not offer any advantage. Preferably a 1 to 2 molar excess of bicarbonate, i.e., 1 to 2 moles more than the stoichiometric amount, will be employed. Since the pH of aqueous alkali metal bicarbonate is about 8.5, stoichiometric excesses of bicarbonate do not make the reaction mixture too alkaline. All of the required alkali metal bicarbonate may be added initially or it may be added incrementally or continuously as the reaction progresses. Preferably the pH of the reaction mixture will be maintained at about from 8.5 to 9.5.

The concentration of polyoxidizable aromatic in the bicarbonate solution can vary within wide limits, depending chiefly on economic and handling considerations. As a practical matter, the amount of water used should be sufficiently large that the aromatic carboxylate formed will remain in solution until oxidation is completed. Initial concentrations up to about 50% polyoxidizable aromatic by weight are generally satisfactory. Normally the initial concentration of polyoxidizable aromatic will be at least about 5% by weight. Concentrations of from about 10 to 30% by weight have been found to be particularly advantageous and hence, are preferred.

To provide a high rate of oxidation without undesirable side reactions, iodine ($I_2$) and iodide ions ($I^-$) are employed as oxidation catalysts. The catalyst is described as iodine *and* iodide ions since they exist in equilibrium under the conditions of the instant process. The iodine catalyst can be introduced in the form of elemental iodine or as one or more inorganic or organic compounds of iodine which form iodide ions under the conditions of the present oxidation process. Suitable iodine compounds include, e.g., hydrogen iodide; the alkali and alkaline earth metal iodides such as potassium iodide; and mono- and polyiodoalkanes, such as cyclohexyl iodide or iodoform. Elemental iodine and alkali metal iodides are preferred. The amount of iodine or iodine compound required to adequately catalyze the reaction varies somewhat with reaction temperature, generally more iodine being used at the lower temperatures. In general, provision of about from 0.01 to 0.3 mole (calculated as iodine) per mole polyoxidizable aromatic is effective, with a molar ratio of about from 0.05 to 0.07:1 being preferred at temperatures of about from 190 to 210° C.

The oxiding agent used in the process of this invention will be a gas-containing molecular oxygen, i.e., pure oxygen, air, oxygen-enriched air, or mixtures of molecular oxygen with one or more additional gases that are inert under the oxidation reaction conditions, such as nitrogen, argon, etc. For reasons of economy and safety, air and air enriched with up to about 50% oxygen by volume are particularly preferred. Since the function of the oxidizing agent is to oxidize the alkyl side-chain to a carboxy group, the rate of reaction is dependent to some extent on the partial pressure of oxygen present at any given time in the area of the reaction mixture. Thus, the rate of reaction is faster with higher oxygen pressures than with lower pressures. The partial pressure of oxygen usually will be about 60–2000 p.s.i., and preferably for optimum speed of reaction and economics, 100–1000 p.s.i. Total pressure should be sufficient to keep practically all reactants in the liquid phase at the elevated temperatures of the oxidation reaction. Total pressure normally will vary from about 300 to 2500 p.s.i., and preferably, from about 600 to 1200 p.s.i.

Temperature is important to the successful execution of the process of this invention. While the reaction temperature should be sufficiently high that the oxidation initiates easily and progresses at a rate sufficiently high that complete oxidation of one alkyl group is rapidly achieved, the temperature should not be so high that overoxidation occurs. The particular temperature most effective for the oxidation will of course depend upon the particular aromatic compound being oxidized, but in general, will be in the range of about from 160 to 230° C. A temperature of about from 190 to 210° C. is particularly preferred because it gives high rates of oxidation coupled with little or no loss of starting material to non-useful products.

Since the polyoxidizable aromatics are insoluble in aqueous alkali metal bicarbonate, the reaction mixture preferably is agitated during the reaction period so that intimate contact of all reactants is assured and substantially complete oxidation will be obtained within the least possible time. Albeit any of the conventional means used for agitating liquid reaction mixtures can be employed, bubbling the oxygen-containing gas through the reaction mixture usually will provide sufficient mixing.

Reaction time generally can vary from about 15 minutes to 3.5 hours. When using the preferred conditions outlined above, best results normally will occur within reaction times of about from 30 to 90 minutes.

Upon completion of the oxidation reaction, the aromatic carboxylate can be recovered by conventional methods or further oxidized to aromatic polycarboxylate. Regarding recovery, the aromatic carboxylate can be acidified with HCl or carbon dioxide and the resulting carboxylic acid (precipitate) collected by filtration or centrifugation. When the polycarboxylic acid is precipitated with carbon dioxide, filtrate from the product recovery step(s) normally will contain bicarbonate, iodine catalyst and partially oxidized derivatives of the initial polyoxidizable aromatic; and as previously indicated, this filtrate can be intermittently or continuously recycled to the oxidizer with a fresh charge of polyoxidizable aromatic, alkali metal bicarbonate, and catalyst (if spent). In a typical continuous operation, raw materials are continuously fed to the beginning of a reaction zone whose size provides the requisite hold-up time; a product stream is continuously withdrawn from the end of the reaction zone, acidified with carbon dioxide to precipitate aromatic carboxylic acid, and then filtered to recover solids; and the filtrate from the product recovery step(s) is continuously recycled to the beginning of the reaction zone where it is combined with fresh raw materials. Where the aromatic carboxylate is to be further oxidized, the reaction product, preferably after extraction of precursors, e.g., with xylene, chloroform or hexane, can be mixed with other required reaction components and then further oxidized, e.g., as described in the aforementioned copending application. Production of aromatic polycarboxylates can be run continuously, e.g., by continuously feeding first stage product, i.e., oxidizable aromatic carboxylate, to the second stage oxidation zone.

The process of this invention is illustrated in the following examples, in which parts and percentages are by weight unless otherwise specifically indicated. In all examples, the pH of the reaction mixture initially is about 8.5, and its pH throughout the reaction period is between about 8.5 and 9.5, all pH's being measured at room temperature.

EXAMPLES 1–22

The data recorded in Table I are obtained using a stainless steel autoclave of appropriate capacity fitted with a stirrer and suitable inlets for air. p-Xylene, potassium bicarbonate, catalyst (when used), and water are charged to the autoclave. The autoclave is sealed, pressurized with air to 1000 p.s.i., and brought to the temperature indicated in Table I. This temperature and pressure are maintained throughout the reaction period, while the reaction mixture is constantly agitated at about 1000 revolutions per minute and air is introduced at the rate indicated in Table I. At the end of the reaction period, the autoclave is cooled and vented and the contents (aqueous solution) removed.

The aqueous solution is extracted with chloroform to remove some p-xylene and non-acidic oxidation products, e.g., p-methylbenzyl alcohol, p-tolualdehyde, etc. The aqueous solution is then acidified with hydrochloric acid to precipitate the organic acids, i.e., p-toluic acid (PTA) and small amounts of terephthalic acid (TPA) and p-formylbenzoic acid (PFBA). The acids are filtered, washed with water, dried and analyzed.

Since about 13 parts of p-xylene are always in the vapor phase and unavailable for oxidation, the conversion figures recorded in Table I have been corrected as indicated in its footnotes to account for this unavailable p-xylene.

Note that the $KIO_3$ employed in Example 20 is an iodate that does not form iodine or iodide ions under the designated reaction conditions.

TABLE I

| Example No. | Reaction mixture (parts by weight) | | | | Reaction conditions | | | Results | | | Analysis of product, percent | | |
|---|---|---|---|---|---|---|---|---|---|---|---|---|---|
| | p-Xylene | KHCO$_3$ | Catalyst | Water | Temp., °C. | Time, hrs. | Air flow [1] | Conversion [2] | Yield [3] | Mole percent recovery [4] | PTA | PFBA | TPA |
| 1 | 106 | 400 | None | 500 | 200 | 2 | 0.1 | 20.7 | 60.1 | 90.2 | 86.7 | 0.5 | 12.8 |
| 2 | 106 | 400 | 10 (KI) | 500 | 200 | 2 | 0.1 | 84.4 | 88.0 | 91.9 | 96.8 | 1.3 | 1.8 |
| 3 | 106 | 400 | 10 (KI) | 500 | 200 | 1 | 0.1 | 78.4 | 86.1 | 90.1 | 97.9 | | 2.1 |
| 4 | 106 | 400 | 10 (KI) | 500 | 180 | 2 | 0.1 | 53.3 | 82.1 | 90.6 | 98.0 | 0.5 | 1.5 |
| 5 | 106 | 400 | 20 (KI) | 500 | 180 | 2 | 0.1 | 66.6 | 87.1 | 92.6 | 97.8 | 1.3 | 0.9 |
| 6 | 106 | 400 | 30 (KI) | 500 | 170 | 2 | 0.1 | 45.7 | 88.9 | 95.2 | 99.4 | | 0.6 |
| 7 | 106 | 300 | 10 (KI) | 500 | 200 | 2 | 0.1 | 85.1 | 91.7 | 94.3 | 98.2 | | 1.8 |
| 8 | 106 | 300 | 20 (KI) | 375 | 200 | 1 | 0.1 | 85.2 | 89.8 | 94.1 | 97.9 | 3.0 | 0.1 |
| 9 | 106 | 200 | 10 (KI) | 500 | 200 | 2 | 0.1 | 67.9 | 80.0 | 93.8 | 85.6 | 9.1 | 5.3 |
| 10 | 106 | 300 | 10 (KI) | 500 | 200 | ½ | 0.1 | 64.7 | 87.8 | 96.0 | 98.3 | | 1.7 |
| 11 | 106 | 300 | 10 (KI) | 500 | 200 | ½ | 0.2 | 68.8 | 87.8 | 94.7 | 98.5 | | 1.5 |
| 12 | 106 | 300 | 10 (KI) | 500 | 200 | ½ | 0.3 | 67.5 | 85.2 | 95.0 | 99.0 | | 1.0 |
| 13 | 106 | 300 | 5 (KI) | 375 | 200 | 1 | 0.1 | 72.7 | 90.4 | 95.0 | 97.2 | 2.2 | 0.6 |
| 14 | 106 | 300 | 10 (KI) | 375 | 200 | 1 | 0.1 | 83.6 | 90.2 | 92.2 | 96.7 | 2.6 | 0.7 |
| 15 | 106 | 300 | 30 (KI) | 375 | 200 | 1 | 0.1 | 84.1 | 87.9 | 93.0 | 97.6 | 1.5 | 0.9 |
| 16 | 212 | 240 | 20 (KI) | 250 | 200 | 2 | 0.05 | 75.2 | 87.2 | 92.9 | 99.6 | | 0.4 |
| 17 | 212 | 240 | 20 (KI) | 750 | 200 | 2 | 0.05 | 75.9 | 87.8 | 95.2 | 97.0 | | 3.0 |
| 18 | 212 | 240 | 20 (KI) | 250 | 180 | 2 | 0.05 | 46.6 | 84.5 | 94.7 | 99.0 | | 1.0 |
| 19 | 212 | 240 | 20 (KI) | 125 | 200 | 2 | 0.05 | 76.7 | 85.1 | 90.4 | 95.4 | 1.9 | 2.7 |
| 20 | 106 | 200 | 12.4 (KIO$_3$) | 250 | 200 | 1½ | 0.1 | 9.2 | 60.3 | 94.5 | 96.9 | 0.8 | 2.3 |
| 21 | 106 | 200 | 10 (KBr) | 250 | 200 | 1½ | 0.1 | 8.7 | 68.0 | 97.2 | 91.6 | 0.7 | 7.7 |
| 22 | 106 | 200 | 10 (KCl) | 250 | 200 | 1½ | 0.1 | 5.1 | 59.0 | 96.9 | 94.8 | 1.0 | 4.2 |

[1] Standard cubic feet per minute per mole p-xylene.

[2] $\dfrac{\text{Moles p-toluic acid}}{\text{Moles p-xylene (13 grams or 0.122 mole p-xylene in vapor state)}} \times 100$

[3] $\dfrac{\text{Moles p-toluic acid}}{\text{(Moles p-xylene, 0.122 mole)} - \text{(moles recovered p-xylene, 0.122 m.) plus moles p-tolualdehyde plus moles p-methylbenzyl alcohol}}$

[4] Mole percent recovery of all $C_8$ compounds, e.g., terephthalic acid p-toluic acid, etc.

EXAMPLE 23

106 parts m-xylene, 200 parts potassium bicarbonate, 10 parts potassium iodide, and 250 parts water are charged to a stainless steel autoclave. The autoclave is sealed, pressurized with air to 1000 p.s.i. and heated to 200° C. The reaction mixture is constantly agitated at about 1000 revolutions per minute while air is introduced at a rate of 0.1 s.c.f.m./mole m-xylene. At the end of a 1½ hour reaction period, the autoclave is cooled and vented and the contents removed.

Subsequent work-up of the reaction product as in Examples 1–22 gives m-toluic acid of 98.2% purity in a yield of 87.3% and a conversion of 81.3%. The mole percent recovery of all $C_8$ compounds is 92.7%.

The following oxidations are performed by substituting an equimolar amount of the designated polyoxidizable aromatic for m-xylene in the process of Example 23:

2-chloro-p-xylene to 3-chloro-4-methylbenzoic acid;
2-methoxy-p-xylene to 3-methoxy-4-methylbenzoic acid; and
2-nitro-p-xylene to 4-methyl-3-nitrobenzoic acid.

In each instance, the conversion, yield, and mole percent recovery are practically the same as in Example 23.

EXAMPLES 24–26

A substituted aromatic hydrocarbon, potassium bicarbonate, potassium iodide and water are fed into a stainless steel autoclave of appropriate capacity. The autoclave is closed, pressurized with oxygen, and brought to the temperature indicated in Table II. Oxygen pressure at reaction temperature is 1000 p.s.i. The mixture is stirred continuously at about 1500 revolutions per minute throughout the reaction period (1 hr.). At the end of the 1 hour reaction period, the autoclave is cooled and vented, and the contents treated as in Examples 1–22 to give the product shown in Table II. In each example the yield and conversion to designated product is greater than 80% and 60%, respectively, and the mole percent recovery of product and its aromatic precursors is greater than 90%.

TABLE II

| Ex. | Starting material | Parts KHCO₃ | KI | H₂O | Temp., °C. | Product |
|---|---|---|---|---|---|---|
| 24 | 11 parts p,p'-dimethyl diphenyl ketone. | 30 | 1 | 70 | 220 | 4-carboxyl-4'-methyl diphenyl ketone. |
| 25 | 13 parts p,p'-ditolyl sulfone. | 20 | 1 | 70 | 220 | 4-carboxy-4'-methyl diphenyl sulfone. |
| 26 | 15.6 parts 2,6-dimethylnaphthalene. | 30 | 1 | 80 | 200 | 2-carboxy-6-methylnaphthalene. |

EXAMPLE 27

3,3'-dimethyl biphenyl is oxidized to 3,3'-dicarboxy biphenyl by following the procedure of Example 24, with the exception that air flowing at a rate of 0.1 standard cubic feet per minute is employed instead of oxygen.

A mixture of 3,3'-, 3,4'- and 4,4'-dimethyl biphenyl isomers is oxidized according to the above procedure to produce a mixture of the corresponding dicarboxylic acids.

EXAMPLE 28

60.5 parts 1,3,4-trimethylbenzene, 200 parts potassium bicarbonate, 5 parts potassium iodide and 250 parts water are charged to a stainless steel autoclave of suitable capacity. The autoclave is sealed, pressurized with air to 1000 p.s.i., and heated to 200° C. The reaction mixture is constantly agitated at 1500 p.p.m. while air is introduced at a rate of 0.2 s.c.f.m./mole of aromatic starting material.

At the end of a 1-hr. reaction period, the autoclave is cooled and vented and the contents removed. The reaction product is recovered and analyzed as in Examples 1–22 to give a mixture of the corresponding monocarboxylic acids of greater than 90% purity in a yield of 91% and a conversion of 85%. The mixture consists of 1-carboxy-3,4-dimethylbenzene (predominant) and some 4-carboxy-1,3-dimethylbenzene and 2-carboxy-1,4-dimethylbenzene. The mole percent recovery of all $C_9$ compounds is greater than 90%.

EXAMPLE 29

106 parts p-xylene, 252 parts sodium bicarbonate, 9 parts sodium iodide, and 500 parts water are charged to a stainless steel autoclave. The autoclave is sealed, pressurized with air to 1000 p.s.i., and heated to 200° C. The reaction mixture is constantly agitated at about 1000 revolutions per minute while air is introduced at a rate of 0.1 s.c.f.m./mole p-xylene. At the end of a 1-hour reaction period, the autoclave is cooled, vented, and the contents removed. The contents are treated as in Examples 1–22 to recover p-toluic acid of 99% purity in 68% conversion and 89% yield. The mole percent recovery of all $C_8$ compounds is 93%.

The above example is twice repeated, with the exception that the sodium bicarbonate is replaced with an equimolar amount of cesium bicarbonate in one instance and an equimolar amount of rubidium bicarbonate in the other instance. In each case the results are the same as in Example 29.

We claim:
1. A process for selectively oxidizing an alkyl group of polyalkyl-substituted aromatic compounds which comprises bringing molecular oxygen into contact with a mixture of polyalkyl-substituted aromatic compound and aqueous alkali metal bicarbonate wherein the alkali metal is of atomic number 11 through 55, in the presence of iodine and iodide ions at a temperature of about from 160 to 230° C., the pH of the reaction mixture being below about 10, the amount of metal bicarbonate in the reaction mixture being sufficient to neutralize carboxyl groups as they are formed, and the aromatic compound being of the formula

$$Q—Z—(R)_n$$

wherein
Z is one of the following aromatic nuclei: benzene, naphthalene, biphenyl sulfone, diphenylalkane wherein the phenyl groups are bonded to the same carbon of a 1 or 2 carbon alkylene moiety, diphenyl ketone or diphenyl ether;
each R is straight chain alkyl of up to 3 carbons and is bonded to a ring carbon of the Z nucleus;
n is 2, 3 or 4;
Q is hydrogen, halogen, nitro, or alkoxy of 1 to 4 carbons and is bonded to a ring carbon of the Z nucleus; and
at least one R is in the meta or para position with respect to at least one substituent other than hydrogen on the same aromatic ring.

2. A process of claim 1 wherein Q is hydrogen, n is 2 and Z is a hydrocarbon nucleus.

3. A process of claim 1 wherein Q is hydrogen and Z is a benzene nucleus.

4. A process of claim 1 wherein R is methyl and n is 2.

5. A process of claim 4 wherein Q is hydrogen.

6. A process of claim 1 wherein said aromatic compound is p-xylene.

7. A process of claim 1 wherein the molecular oxygen has a partial pressure of about 60 to 2000 p.s.i.

8. A process of claim 1 wherein the temperature is about from 190 to 210° C.

9. A process of claim 1 wherein the iodine and iodide ions are present in an amount of about from 0.01 to 0.3 mole, calculated as iodine, per mole of said aromatic compound.

10. A process of claim 9 wherein the molecular oxygen has a partial pressure of about from 60 to 2000 p.s.i., Q is hydrogen and $n$ is 2.

11. A process of claim 10 wherein the molecular oxygen is at a partial pressure of about from 100 to 1000 p.s.i., the temperature is about from 190 to 210° C., the amount of iodine and iodide ions is about from 0.05 to 0.07 mole, calculated as iodine, per mole of said aromatic compound, R is methyl, Z is a hydrocarbon nucleus, and the pH of the reaction mixture is maintained at about from 8.5 to 9.5.

12. A process of claim 11 wherein the aromatic compound is p-xylene.

References Cited
UNITED STATES PATENTS

| | | | |
|---|---|---|---|
| 2,698,865 | 1/1955 | Katzschmann | 260—524 |
| 3,331,870 | 7/1967 | Feighner et al. | 260—524 |

LORRAINE A. WEINBERGER, Primary Examiner

R. S. WEISSBERG, Assistant Examiner

U.S. Cl. X.R.

260—517, 520, 521 R